Figure 1:
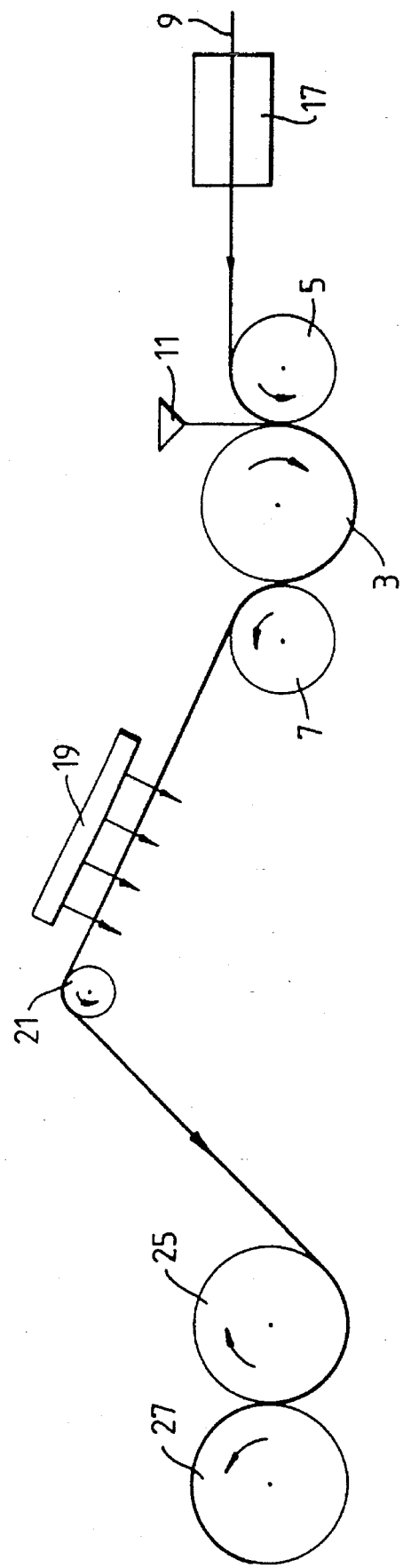

United States Patent [19]

Waddington

[11] Patent Number: 5,578,382
[45] Date of Patent: Nov. 26, 1996

[54] POLYHYDROXYALKANOATES AND FILM FORMATION THEREFROM

[75] Inventor: Simon D. Waddington, Cambridge, Mass.

[73] Assignee: Zeneca Limited, London, England

[21] Appl. No.: 595,213

[22] Filed: Feb. 1, 1996

Related U.S. Application Data

[62] Division of Ser. No. 491,929, Jul. 13, 1995, Pat. No. 5,534,616.

[51] Int. Cl.⁶ .................................................. B32B 27/06
[52] U.S. Cl. .......................... 428/480; 528/361; 525/450; 428/35.8; 428/364
[58] Field of Search .......................... 528/361; 525/450; 428/35.8, 364, 480

[56] References Cited

U.S. PATENT DOCUMENTS

| | | | |
|---|---|---|---|
| 4,391,766 | 7/1983 | Barham et al. | 264/210.1 |
| 4,427,614 | 1/1984 | Barham et al. | 264/210.1 |
| 4,537,738 | 8/1985 | Holmes | 264/210.5 |
| 4,880,592 | 11/1989 | Martini et al. | 264/514 |
| 5,191,037 | 3/1993 | Doi et al. | 525/450 |
| 5,227,415 | 7/1993 | Masuda et al. | 524/17 |
| 5,231,148 | 7/1993 | Kleinke et al. | 525/450 |
| 5,281,649 | 7/1994 | Organ et al. | 524/428 |
| 5,310,865 | 5/1994 | Enomoto et al. | 528/361 |
| 5,428,126 | 6/1995 | Kashima et al. | 528/490 |
| 5,437,918 | 8/1995 | Taniguchi et al. | 428/224 |

Primary Examiner—Samuel A. Acquah
Attorney, Agent, or Firm—Cushman Darby & Cushman, LLP

[57] ABSTRACT

A supported or cast film of a polyhydroxyalkanoate polymer, such as a polyhydroxybutyrate/valerate polymer, can be prepared by applying a layer of molten polymer to a cool (typically 4° to 20° C.) surface not substantially above the glass transition temperature of the polymer, so as to form a solid, glassy film with a high density of nucleation sites; subsequently the temperature of the film so formed is raised, for example to 40° C. or more, towards the optimum temperature for growth of the polymer's spherulites effectively separating the film formation/nucleation step from the crystallisation step (growth of spherulites around the nucleation sites). Smaller crystallites are formed, and the film has improved barrier properties.

3 Claims, 1 Drawing Sheet

POLYHYDROXYALKANOATES AND FILM FORMATION THEREFROM

This is a division of application Ser. No. 08/491,929, filed Jul. 13, 1995 now U.S. Pat. No. 5,534,616.

This invention relates to polyhydroxyalkanaoates and the production of films therefrom, which may be free standing or supported.

Films of polymers have many uses. Free standing films of plastics materials have innumerable industrial and consumer applications. Supported films, for example coated paper, are also widely useful, particularly for imparting the qualities of moisture resistance and heat-sealability to the coated support.

In principle, films can be prepared from polymer either by using a preparation of molten polymer or by the use of a solution of polymer in a suitable solvent. In the latter case, it is clearly necessary to match a polymer with a suitable solvent for it; for polyhydroxyalkanoate polymers, which have the merit of being biodegradable, a problem exists in that the suitable solvents are generally chlorinated and therefore environmentally detrimental. Attention has therefore diverted to attempting to prepare films of these biodegradable polymers from molten preparations of the polymer; and it is to this area that the present invention is directed.

Extrusion coating of polymer films from molten polymer has been developed for a number of plastics, in particular low density polyethylene. The standard procedure is for molten polyethylene to be extrusion coated onto a chilled roller, known in the art as a chill-roll. Low density polyethylene crystallises very quickly, and at reasonably low temperatures, so that it is adequately crystalline before it is drawn off the chill-roll, even when the roll is operating at very high line speeds, such as 700 m/min. Polyhydroxyalkanoate polymers crystallise much more slowly than low density polyethylene at a typical chill-roll temperature.

The process of polyhydroxyalkanoate crystallisation from the molten state involves growth of crystallites which are often spherical regions of crystallised material (spherulites). A nucleation site for a crystallite may occur in the pure polymer or can be artificially introduced by the use of a nucleating agent. We have found that the optimum temperature for creating nucleating sites is considerably lower than the optimum temperature for growth of the crystallites.

It has now been found that it is possible to adapt a chill-roll process for the preparation of a polyhydroxyalkanoate film if the film formation is allowed to take place on the roll at a relatively low temperature, so as to improve or optimise nucleation density and maintain the film in a glassy state which is of low tackiness and subsequently the film temperature is raised to enable crystallisation to take place. Acceptable line speeds are practicable.

The film so produced has smaller crystallites than that produced if the chill roll is at higher temperatures. This can have two advantages: firstly, it may lead to improved mechanical properties. Secondly, smaller crystallites can lead to reduced voiding/pinholing at the boundaries between crystallites. This improves the coatings barrier properties, and is an important feature of films whether free standing or supported for example on paper or board. If the coating tends to pinhole or crack, its efficiency is reduced as a barrier medium. Typically paper coatings are between 10 and 25 microns, and hence crystallites should be smaller than 10 microns. We have devised a process which produces crystallites <10 μm and typically <7 μm, mostly 3–5 μm.

According to a first aspect of the present invention, there is provided a process for preparing a film of a polyhydroxyalkanoate polymer, the process comprising applying a layer of molten polyhydroxyalkanoate to a surface not substantially above the glass transition temperature of the polymer and for example below 30° C., preferably below 20° C. and more preferably below 15° C. so as to form a film and subsequently raising the temperature of the film so formed to a temperature of 45° to 100° C. and preferably 50° to 95° C. and more preferably 60° to 80° C.

Without wishing to be bound by this explanation, it is believed that film which has a low degree of crystallinity and is well above the glass transition temperature is unacceptably tacky and that if it has a high degree of crystallinity it has in general a low extension to break. It is believed however that the aforesaid process causes the formation of a film which is not unacceptably tacky with small crystallites and which has better mechanical performance.

The polymer after raising the temperature as aforesaid is preferably 40 to 70% crystalline.

If the film is above the glass transition temperature its glassy state is unstable; close to the transition temperature the rate of crystallisation is slow but large numbers of nuclei are formed. It is preferred that the surface to which the layer is applied should be at a temperature between the glass transition temperature and 30° C. and more preferably at most 20° C. and that the film should be raised to a temperature of 45° to 100° C. for example 50° to 90° C. and preferably 60° to 80° C. to permit crystallite growth.

The polymer may be or include at least one polyester having units of formula I:

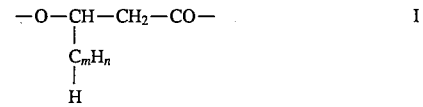

wherein m is in the range 1 to 11 and n is 2m or (when m is at least 2) 2m-2.

In preferred polyesters, m is 1 or 2, n is 2m and there may be units with m=1 and m=2 copolymerised together. Certain preferred polyesters contain a preponderance of m=1 units, especially with 70 to 98 mol % of such units, the balance being units in which m=2. The molecular weight of the polymer is preferably over 100,000, particularly for supported films, and more preferably over 300,000, particularly for unsupported films.

The polyhydroxyalkanoate is preferred for many applications to be a blend of two or more polymers differing in the value of m. A particular example contains:
a) a polymer consisting essentially of formula I units in which 2 to 5 mol % of units have m=2 and the rest m=1; and
b) a polymer consisting essentially of formula I units in which 5 to 30 mol % of units have m=2, the rest m=1.

The proportions of the polymer in such a blend is preferably such as to give an average m=2 content in the range 2 to 28 mol %, and typically 4 to 18 mol %. In its preferred form the polymer can therefore be seen to be a poly{hydroxybutyrate/valerate} copolymer or blend of copolymers.

The polyhydroxyalkanoate may be a fermentation product, particularly of a microbiological process, whereby a microorganism lays down polyhydroxyalkanoate during normal or manipulated growth. Manipulation may be achieved by removing or failing to provide one or more nutrients necessary for cell multiplication. The microorganisms may be wild type or mutated or may have the necessary genetic material introduced into it, for example by any of the methods of recombinant DNA technology. It is to be emphasised that it is not necessary for the polyhydroxyalkanoate-producing organism to be a microorganism, but at present such organisms are preferred.

A number of suitable microbiological processes for the production of polyhydroxyalkanoate polymers have been described in the art. For example, to produce formula I material with m=1 or m=partly 1, partly 2, the process of EP-A-0069497 may be used using the species *Alcaligenes eutrophus*. For formula I materials with m=1, the process of U.S. Pat. No. 4,101,533 can be used; this process uses the microorganism *Alcaligenes eutropha* H-16. Similar materials can be produced using *Alcaligenes latus*, as disclosed in EP-A-0144017. For formula I materials with m having a value from 3 to 7 various *Pseudomonas spp.* can be used, as disclosed in EP-A-0392687.

In the process of the invention, the film is formed by applying the layer of the molten polyhydroxyalkanoate polymer to a surface. This application can be achieved by melt extrusion through an appropriately configured melt extrusion die. The configuration of the die is not believed to be particularly critical, and the precedents set in low density polyethylene melt extrusion methodology can be followed or readily adapted by those skilled in the art.

Molten polyhydroxyalkanoate may be co-extruded with one or more other polymers, which may have additional useful functionality (for example, by functioning as adhesives or barrier layers, for example). Generally, the polyhydroxyalkanoate will be the layer which comes into contact with the surface of the chill-roll.

By means of the invention, films may be formed onto a web, which thereby becomes coated. The web may be any suitable material, such as paper or fabric, which may be knitted, woven or even non-woven. In the case of a non-woven fabric, the melt may penetrate into the non-woven structure, following the contours of the fabric. The web could also be a film of a second polymer. The second polymer should be a compatible polymer if a multilayer film is required. Alternatively, the second polymer should be non-compatible if it is to be stripped from the first; this may leave the polyhydroxyalkanoate film with qualities superior to a comparable cast film.

A web may, prior to being coated, be pre-treated for example by a corona treater. In practice, any suitable pre-treatment can be used if pretreatment is required at all.

The invention is suitable for preparing cast films, in which the polyhydroxyalkanoate film is not supported by a web. The film may be cast either onto a roller, as in certain chill-roll processes known from polyethylene casting, or the invention may use an adaption of such a process, for example using an endless belt instead of a roller. The cast film may then be stretched, if required, before or while heating of the film takes place.

The temperature of the chill-roll or other surface to which the polymer is cast may be controlled by any suitable refrigeration means. A heat transfer fluid such as water may, when appropriately remotely chilled, be used in an indirect refrigeration system.

The temperature of the surface used in the invention will depend on the glass transition temperature of the polymer from which film is being formed, which in turn varies with the polymer composition. For a polyhydroxybutyrate/valerate copolymer, the glass transition temperature decreases as the hydroxyvalerate content increases. The glass transition temperatures for polymers suitable for use in the invention can readily be determined by those skilled in the art; typically, many glass transition temperatures of suitable polymers will be in the region of −10° C. to 20° C., the exact value depending on the technique used in its determination. Table 1 shows typical values derived by Dynamic Mechanical Analysis, as one example of an analytical approach.

TABLE 1

| Comonomer HV Level (%) | *Glass Transition (°C.) |
|---|---|
| 0 | 10 |
| 3 | 8 |
| 9 | 6 |
| 14 | 4 |
| 20 | −1 |
| 25 | −6 |

*position of E" peak at 5 Hz

When the film is being formed on the surface, the polymer (and/or surface) temperature should not be substantially above the glass transition temperature, in accordance with the invention. The temperature should therefore be below, at or near the glass transition temperature. If the temperature is above the glass transition temperature, it will as a rule not be more than about 15° or 20° C. above the glass transition temperature of the base, pre-compounded polymer, as measured by Dynamic Mechanical Thermal Analysis (DMTA). In practice, the temperatures used will generally be below about 30° C., so as to be sufficiently close to, or below, the glass transition temperature of the polymer. However, there is an advantage in not having the temperature too low, particularly in humid conditions, as water droplets will form below the dew point.

At the temperature of the chill-roll or other surface used for film formation in the invention, relatively little or no crystallisation will occur at the temperatures used. In this way, the film will be in a glassy state. The number of nucleation sites formed at these temperatures will be significantly higher than if the film had been cast onto a chill-roll held at the optimum temperature for the rate of crystallisation of the polymer, which is typically 40° to 60° C. higher. The overall crystallisation rate may be faster due to the increased number of nucleation sites, and hence higher line speeds may be achieved.

After the film has been formed, its temperature is raised, in accordance with the invention, towards (and preferably so as to be at or near) the optimum temperature for growth of the polymer's spherulites. The crystallisation temperature is above the glass transition temperature and may vary from polymer to polymer. In a polyhydroxybutyrate/valerate copolymer, it may vary with hydroxyvalerate content. If the supported or unsupported film of polymer is formed on a roller, the film will generally be removed from the roller before the temperature is increased.

The film temperature may be increased by passing the film through an oven or past one of more infra-red heaters, for example. It is to be stressed that any suitable method of heating can be used. The temperature of the film will generally be brought into the range of from 40° to 100° C. typically about 50° to 90° C. The dwell time of the film in the heated area will generally be sufficient to cause crystallisation of a sufficient proportion of the polymer. The dwell time used in practice is chosen to give adequate crystallite growth rate for the polymer used and will often be from 1 second to 10 seconds, typically about 1.5 to 3 seconds.

The presence of a nucleating agent is often preferable in the polymer composition. Examples of conventional nucleating agents (to which the invention is not limited) include boron nitride, (see EP-A-0291024), ammonium chloride (see WO-A-9119759) and DZB/ZnSt (see EP-A-0400855).

The amount of nucleating agent if present will generally be less than or equal to one part per hundred resin (phr) if only because of the wasted cost of adding excess nucleating agent. The lower limit of nucleating agent present is effectively 0 phr, which is to say that its presence is optional.

Another optional ingredient in the polymer composition is a release agent. Conventional release agents may be used, but the invention is not in any way restricted to the use of release agents which are known to date.

A further optional ingredient is a plasticiser. Plasticisers may improve the processability of the composition or improve its mechanical performance. Again, conventional plasticisers may be used.

Films, whether coated on a web or free-standing, of various thicknesses can be produced by means of the invention. In particular, films of from 1 to 100 μm, and typically from 5 to 40 μm, may be produced.

According to a second aspect of the invention, there is provided a film produced by the above process. Preferred features for the second aspect of the invention are as for the first aspect, mutatis mutandis.

This invention also comprises a polymer of one or more hydroxyalkanoic acids which may be as hereinafter described of which at least one is hydroxybutyric acid of which 40 to 70% is crystalline (as judged by X-ray diffraction) and of which at least 80% of the crystallites of diameter greater than 3 μm are smaller than 7 μm in diameter (the diameter being calculated as that of a sphere of volume equal to the crystallite) and films made therefrom.

For a better understanding of the present invention, and to show how it may be put into effect, reference will now be made by way of example to the accompanying drawing, in which:

FIG. 1 shows, schematically and not to scale, an apparatus suitable for film-coating a web in accordance with the invention.

Referring now to FIG. 1, a web-coating apparatus 1 comprises a chill-roll 3 flanked each side by one of a pair of nip-rolls 5 and 7 each of which cooperates with the chill-roll and rotates in an opposite sense to it. A web 9 of paper or other suitable material enters the device from the right in FIG. 1 and passes through a corona treater 17, which may be used to pretreat the surface of the paper prior to being coated by the polymer. The web then passes over the first nip-roll 5.

As the web passes into the nip between the first nip-roll 5 and the chill-roll 3, molten polyhydroxyalkanoate is applied to the nip from an extruder 11 positioned above it for that purpose. The now coated web 9 passes round the under side of the chill roll, with the polyhydroxyalkanoate polymer remaining in contact with it and becoming sufficiently solid or glassy by virtue of the lower temperature of the chill-roll 3. The coated web 9 now passes through and emerges from the nip formed between the chill-roll 3 and the second nip-roll 7, whereafter it passes underneath an infra-red heater 19, set such that the temperature so that the temperature of the polymer rises to or towards its optimum temperature for spherulite growth rate. The web 9 with now-crystalline polyhydroxyalkanoate polymer coated on it emerges from underneath the heater, passes over a free moving roller 21 and moves through to a wind-up roll 27, where it is stored temporarily.

The invention will now be illustrated with the following examples.

EXAMPLE 1

A formulation of polyhydroxybutyrate/valerate copolymer was prepared, having a hydroxyvalerate content of 10 mol % and 1 phr boron nitride nucleating agent. Granules of the formulation were fed into an extruder with a 40 mm diameter screw. The screw was operated at a speed of 30 rpm and the associated current draw was 16A. The extruder fed into a 20 cm wide die. The temperature of the melt measured close to the die was 180° C. according to a calibrated thermocouple.

In the apparatus shown in FIG. 1, molten polymer was extruded from the extruder 11 into the nip between the first nip-roll 5 and the chill-roll 3. The chill-roll was water cooled to 4° C. The gap between the die lips was set to 0.4 mm; the air gap between these lips and the nip was set to about 10 cm. In this Example, the polymer was coated on the paper at a line speed of 60 m/min. Downstream of the chili-roll, the coated web was heated to approximately 80° C. with an infra red heater so as to crystallise the polymer. A 10 μm coating was produced on the paper. The coating was satisfactory in its appearance and ran smoothly through to the wind-up. The coated paper could be unwound without any difficulties.

EXAMPLE 2

The procedure of Example 1 was followed, except that the formulation had a 6 mol % hydroxyvalerate content. The boron nitride content was still 1 phr. The melt temperature was 193° C., the screw-speed of the extruder was 30 rpm and the current draw 20A. In this case, the chill-roll was set at 12° C. but the gap between the lips of the die was 0.3 mm and the air gap between the die and the nip was set to about 5 cm. An entirely satisfactory coating (thickness not measured) onto paper was produced at a line speed of 40 m/min.

EXAMPLE 3

The procedure of Example 2 was followed, except that the melt temperature was 190° C. and the chill-roll was set at 8° C. Again, an entirely satisfactory coating was produced on paper at a line speed of 40 m/min.

Thin cross sections of the film and coatings according to the invention may be tested for crystallite size as follows. They are microtomed and examined by transmitted light microscopy. They are examined in crossed polars to reveal the crystalline texture of the samples.

For coatings produced by the method in this invention fine spherulite structure is observed. The size of the spherulites and their structure depends upon the exact formulation used. In general however, at least 80% of the spherulites observed of diameter greater than 3 μm are <7 μm in diameter and many in the range 3–5 μm.

Film according to the invention is shown to have good barrier properties by the following tests. For each of the coatings, an iodine or dyed water solution was wiped on the surface of the coating. No or few pinholes were observed as a result of the test. Scanning electron microcopy indicated little voiding at the surface of the coating.

I claim:

1. A polymer of one or more hydroxyalkanoic acids of which at least one is hydroxybutyric acid of which 40 to 70% is crystalline (as judged by X-ray diffraction) and of which at least 80% of the crystallites of diameter greater than 3 μm are smaller than 7 μm in diameter (the diameter being calculated as that of a sphere of volume equal to the crystallite).

2. A polymer as claimed in claim 1 in which the polymer is a copolymer of hydroxybutyric acid which contains 2 to 30% of hydroxyvaleric acid residues, the balance being substantially hydroxybutyric acid residues.

3. A film or coating which comprises a polymer as claimed in claim 1.

* * * * *